United States Patent [19]

Yanagisawa et al.

[11] Patent Number: 5,365,052
[45] Date of Patent: Nov. 15, 1994

[54] OPTICAL INFORMATION READING APPARATUS WITH CONTROLLED NUMERICAL APERTURE RELATIONSHIP BETWEEN FOCUSING AND RECEIVING OPTICAL SYSTEMS

[75] Inventors: Takuma Yanagisawa; Seiichi Ohsawa, both of Tsurugashima, Japan

[73] Assignee: Pioneer Electronic Corporation, Tokyo, Japan

[21] Appl. No.: 111,949

[22] Filed: Aug. 26, 1993

[30] Foreign Application Priority Data

Sep. 1, 1992 [JP] Japan .................. 4-233690

[51] Int. Cl.⁵ .................................. G01J 1/20
[52] U.S. Cl. .................. 250/201.5; 369/100; 369/275.4
[58] Field of Search ........... 250/201.5; 369/44.23, 369/44.24, 44.11, 100, 184, 111, 284, 286, 275.1, 275.4

[56] References Cited

U.S. PATENT DOCUMENTS 4,633,451 12/1986 Ahn et al. .............. 369/44.11

Primary Examiner—Davic C. Nelms
Assistant Examiner—K. Shami
Attorney, Agent, or Firm—Sughrue, Mion, Zinn, Macpeak & Seas

[57] ABSTRACT

A reflected beam from a reflective film of an optical disk exhibiting light intensity dependency is efficiently received. In the optical system, a collimator lens, a polarization beam splitter, a quarter wave plate and an objective lens are disposed in turn in an optical path between a laser and an optical disk from the laser side. A light receiver is disposed on another optical path extending from the polarization beam splitter. A light receiving aperture diameter of the objective lens for passing the reflected beam from the optical disk therethrough is made larger than an incident aperture diameter of the objective lens for impinging the reading beam on the recording medium. This structure enables information signals to be recorded at higher density on the recording medium to be reproduced.

4 Claims, 5 Drawing Sheets

OPTICAL INFORMATION READING APPARATUS WITH CONTROLLED NUMERICAL APERTURE RELATIONSHIP BETWEEN FOCUSING AND RECEIVING OPTICAL SYSTEMS

BACKGROUND OF THE INVENTION

1. Field of the Invention

This invention relates to an optical information reading apparatus.

2. Description of the Related Art

In optical information reading apparatuses including an optical disk player or the like, reproduction of an optical disk which has pits recorded thereon at high density requires a reproduction optical system having high resolution corresponding to the recording density. For this purpose, To reproduce a reflective type of optical disk, most reproduction optical system shown in FIG. 1 comprises a collimator lens 3, a polarization beam splitter 4, a quarter wave plate 5, and an objective lens 6 on an optical path X between a semiconductor laser 2 and an optical disk 1 from the laser in turn. They causes a reading beam from the semiconductor laser 2 to be impinged on the optical disk 1. To receive a reflected beam from the optical disk 1, the reproducing optical system employs the objective lens 6 as a condenser lens, and a light receiver 7 is disposed on another optical path Y extending from the polarization beam splitter 4.

In the above case, OTF (Optical Transfer Function) of the reproducing optical system is an auto-correlation function of a pupil function of the objective lens 6. When the OTF is calculated on assumption that the objective lens 6 has a circular aperture, a cut-off spatial frequency fc can be express by $2NA/\lambda$ where $\lambda$ represents the wavelength of the semiconductor laser 2 and NA represents the numerical aperture of the objective lens 6.

Stated another way, the reproducing optical system of FIG. 1 cannot read out information signals recorded on an optical disk at a high density whose spacial frequency is higher than the cut-off spatial frequency fc.

Recently, an optical disk having information signals recorded thereon at a high density is attempted to be reproduced by a conventional optical system. In such a conventional system, a plurality of pits may be included within a single beam spot 10 shown in FIG. 2(a), so that information signal corresponding to one pit cannot be read out from the optical disk. To solve this problem, there has been proposed an optical disk 1 with a reflective film 12 made of a material whose reflectance depends on the incident light intensity, so that the effective diameter of a beam spot received thereon is apparently reduced. For example, when the amplitude reflectance of the reflective film 12 increases substantially in proportion to the incident light intensity therein, the intensity distribution of the incident beam impinged onto the optical disk 1 shows an Airy pattern as shown in FIG. 2(b). Then a reflected beam from the optical disk 1 presents a lower amplitude reflectance in a peripheral portion so that the intensity of the peripheral portion becomes considerably lower than that of a central portion, as shown in FIG. 2(c). For this reason, the spot diameter of the reflected beam received by the reproducing optical system, i.e., effective spot diameter of the received beam is reduced. As a result, only one of the pits 11 in the beam spot 10 can be read. Thus, the proposed optical disk 1 described above enables conventional reproducing optical system to reproduce finely recorded information signals corresponding to the spatial frequency above the cut-off spatial frequency which is limited by the reproduction optical system.

However, when the reflective film 12 is formed of the material whose reflectance depends on the incident light intensity, the effective received beam spot diameter is reduced, while its scattering angle becomes larger. Specifically explaining, a beam diameter r emitted onto the optical disk 1 is defined by the following equation (1), $$r = k \cdot d\lambda / a \qquad (1)$$

wherein an aperture diameter of the objective lens 6 is a, the distance between the objective lens 6 and the optical disk 1 is d, and k is a proportional constant. When the beam diameter of the reflected beam becomes $\alpha r$ ($\alpha < 1$) due to the intensity dependency of the reflectance of the film, an aperture diameter a' of the reflected beam distributing on the surface of the objective lens 6 is expressed by the following equation (2):

$$a' = k \cdot d\lambda / \alpha r \qquad (2)$$

Therefore, from the equations (1) and (2), the relationship between the aperture diameter a of the objective lens 6 and the aperture diameter a' of the reflected beam thereon is expressed by:

$$a' = a/\alpha \qquad (3)$$

Thus, a' < a stands. This means that if the aperture diameter of the objective lens 6 is equal to that of the condenser lens, reflected beams having large scattering angles will stray from the aperture of the objective lens and accordingly will not be led onto the objective lens.

The present invention has been made in view of the above-mentioned problems, and a main object thereof is to provide an optical information reading apparatus which is capable of efficiently receiving the reflected beam.

It is another object of the present invention to provide an optical information reading apparatus which is capable of efficiently receiving a reflected beam in case that the reflectance of a reflective film of an optical disk depends on an incident light intensity.

SUMMARY OF THE INVENTION

The optical information reading apparatus of the present invention comprises a focusing optical system for impinging a reading beam on a recording medium including a reflective film whose reflectance depends on an incident light intensity therein, and a receiving optical system for receiving the reading beam reflected by said recording medium, wherein the effective numerical aperture of said receiving optical system is larger than the effective numerical aperture of said focusing optical system.

According to the present invention, in the optical information reading apparatus, a reading beam is impinging on the recording medium, passing through the focusing optical system, to read out the information signals recorded on the recording medium including the reflective film whose reflectance depends on the incident light intensity. Because of the reflective dependency, effective spot diameter is smaller than the incident beam diameter. The reading beam reflected from the reflective film as a reflected beam is scattered over a larger angle than the angular width of the incident beam because of the effective spot diameter. However, the effective numerical aperture of the receiving optical system is larger than that of the focusing optical system, so that the reflected beam with large scattering angle can be efficiently received by the receiving optical system. This means that cut-off spatial frequency of a reproducing optical system becomes higher, thus allowing the reproducing optical system to reproduce a recording medium having information signals at a high density.

DESCRIPTION OF THE PREFERRED EMBODIMENTS

To clarify the above and other objects, the structure and advantages of the present invention, preferred embodiments of the present invention will be described hereinafter with reference to the accompanying drawings.

Figure 1:
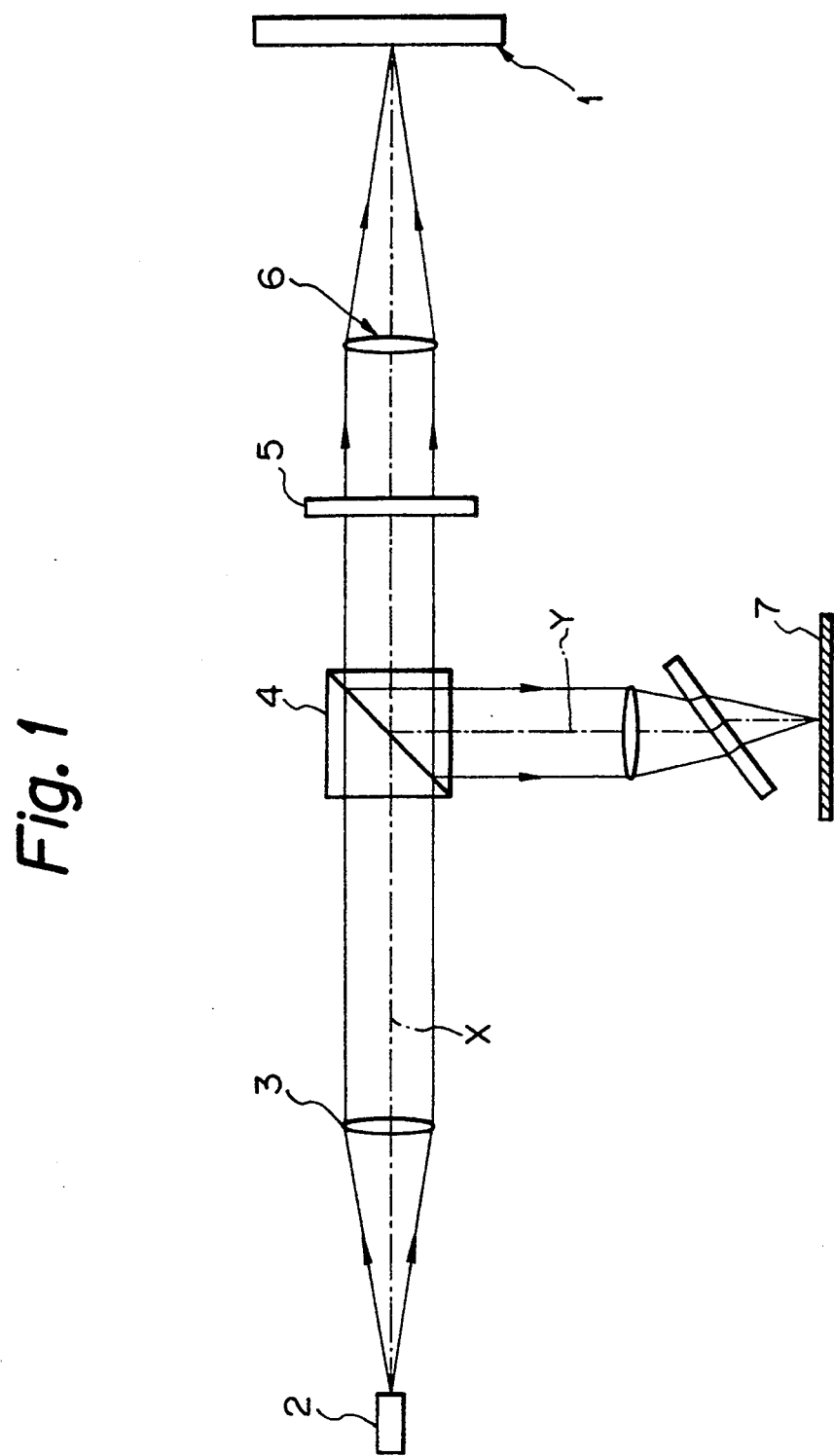
FIG. 1 is a diagram showing a conventional reproducing optical system of an optical disk player.
Figures 2A, 2B, 2C:
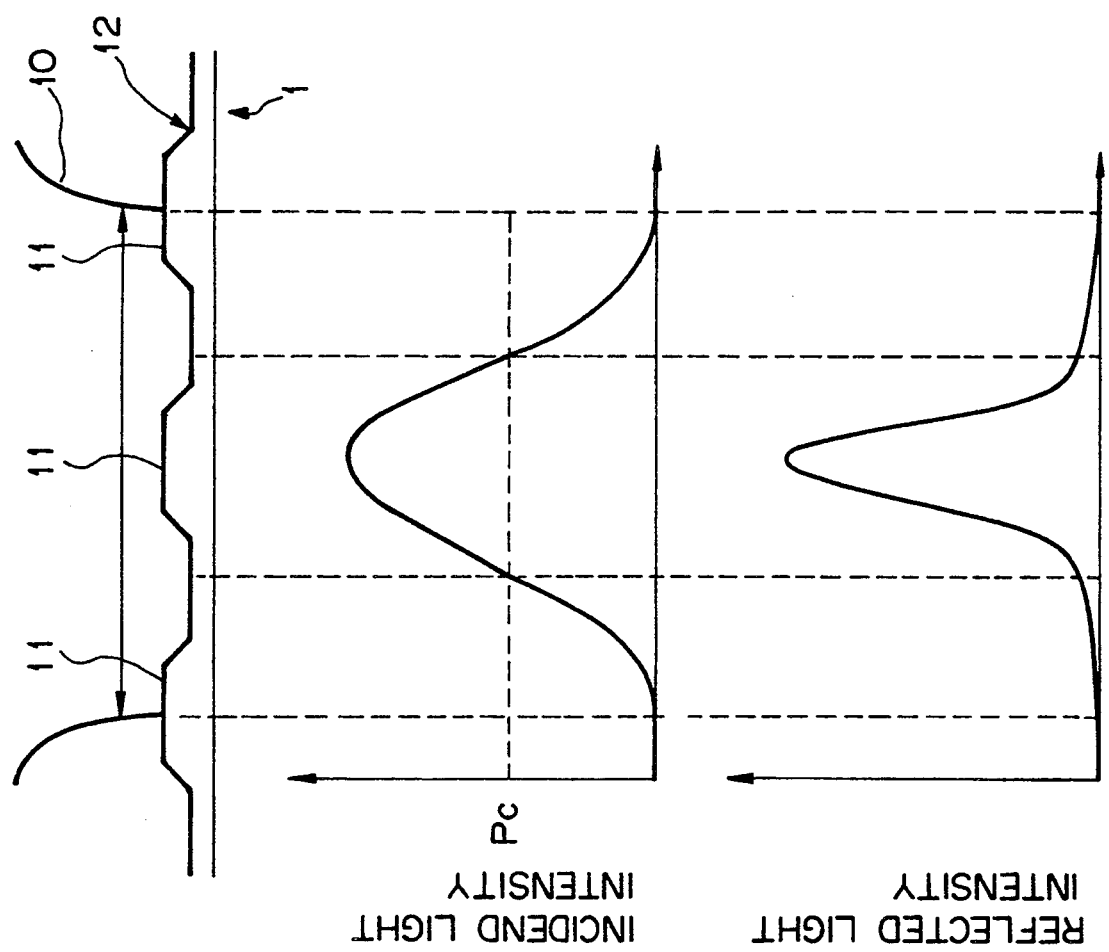
FIG. 2(a) is a cross section of an incident beam impinging on an optical disk.
FIG. 2(b) is a cross section of the intensity distribution of the incident beam.
FIG. 2(c) is a cross section of the intensity distribution of the reflected beam.
Figure 3:
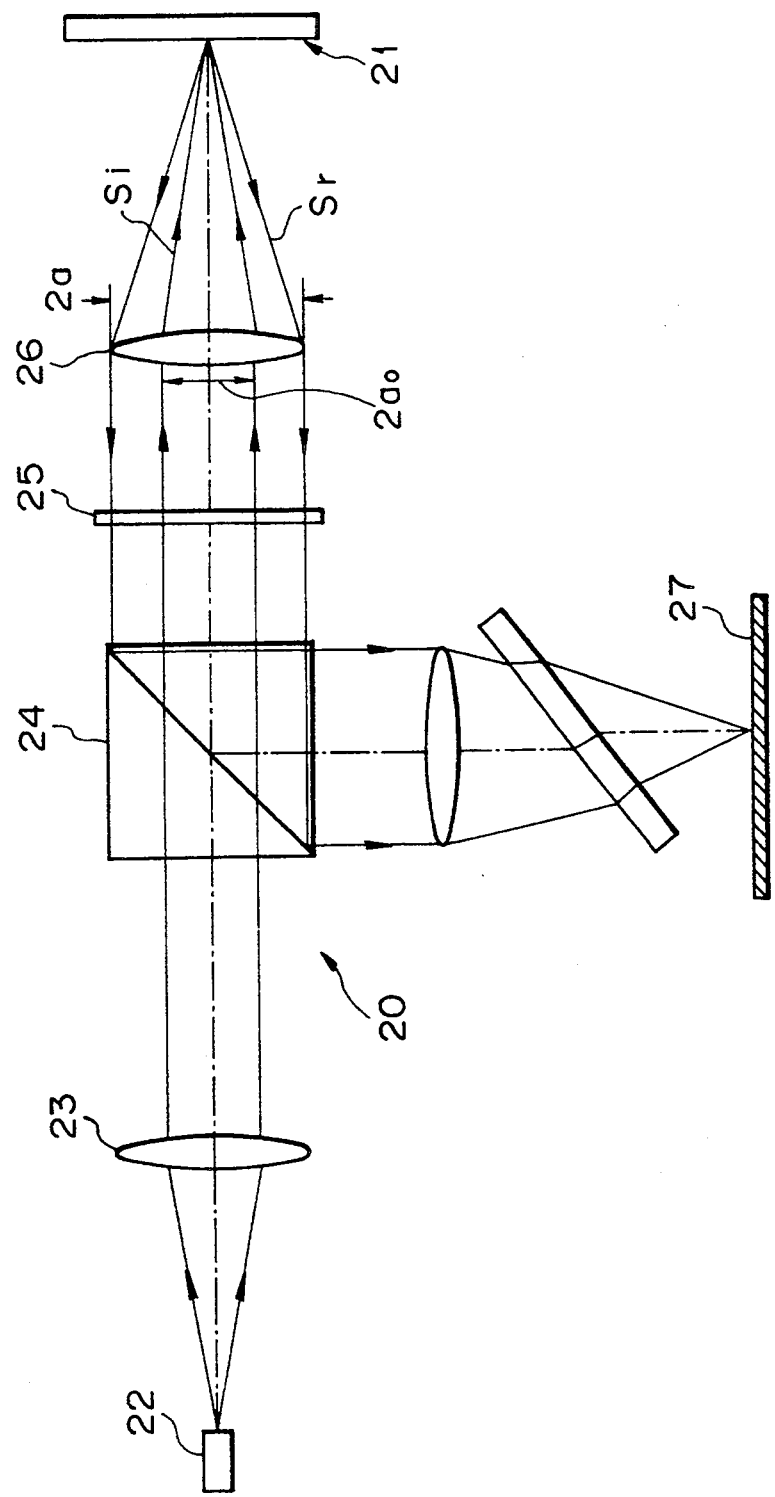
FIG. 3 is a diagram showing one embodiment according to the present invention.

FIGS. 3 shows an optical disk player according to the present invention. Referring to FIG. 3, a reproducing optical system 20 of the optical disk player comprises a focusing optical system and a receiving optical system. The focusing optical system is for impinging a reading beam Si from a semiconductor laser 22 on a reflective type of an optical disk 21 as a recording medium, and a receiving optical system is for receiving the reflected reading beam from the optical disk 21 as a reflected beam. In the focusing optical system, a collimator lens 23, a polarization beam splitter 24, a quarter wave plate 25 and an objective lens 26 are disposed in turn on an optical path between the semiconductor laser 22 and the optical disk 21 from the laser. On the other hand, in the receiving optical system, the objective lens 26 serves as a condenser lens, and a light receiver 27 is disposed on another optical path extending from the polarization beam splitter 24.

A lens with a numerical aperture $NA_d$ is employed as the objective lens 26. A beam diameter $2a_0$ of the reading beam Si passing through the objective lens 26 toward the optical disk 21 has previously been adjusted so as to be smaller than the aperture diameter $2a$ ($a > a_0$) of the objective lens 26. In other words, the reading beam Si is not incident on a peripheral portion of the objective lens 26, so that the effective numerical aperture $NA_d$ of the objective lens 26 in the receiving optical system may be regarded to be larger than the effective numerical aperture $NA_0$ of the objective lens 26 in the focusing optical system. Thus, the numerical aperture $NA_d$ of the condenser lens for collecting a reflected beam Sr may be made twice as the effective numerical aperture $NA_0$ of the objective lens 26 which focuses the reading beam Si. It should be noted in this case that the ratio of the numerical aperture $NA_d$ to the effective numerical aperture $NA_0$ is not limited to two, but any number may be taken as long as the numerical aperture $NA_d$ is larger than the effective numerical aperture $NA_0$.

The optical disk 21 has a reflective film (not shown) on which plurality of pits having lengths corresponding to information signals are formed in a predetermined manner. This reflective film is formed of a three-dimensional non-linear optical material, such as amorphus silicon and indium antimonide. Furthermore, the reflectance of the reflective film depends on the intensity of an incident beam therein.

On the reproduction of the optical disk 21 with the optical system described above, a beam emitted from the semiconductor laser 22 passes through the collimator lens 23, the polarization beam splitter 24, the quarter wave plate 25, and the objective lens 26 in turn and impinges onto the optical disk 21. Then, the beam is reflected by the reflective film of the optical disk 21 and turns out to be a reflected beam Sr. In case that the amplitude reflectance of the reflective film increases substantially in proportion to the incident light intensity, the intensity distribution of the reading beam Si on the optical disk 21 generally is substantially equal to an Airy pattern. Then the intensity of the peripheral portion of the reflected beam Sr becomes considerably lower than that of its central portion, because the reflectance of the peripheral portion is lower than that of the central portion. In other words, an effective spot diameter of the reading beam Si seems to be reduced. The beam Sr from the effective spot is collected by the objective lens 26, then it passes through the quarter wave plate 25. Its optical path is then bent by the polarization beam splitter 24. At last, the beam Sr is led to the light receiver 27. The light receiver 27 transduces the beam Sr to an electric signal whose level corresponds to the intensity of the beam. The electric signals is reproduced by a circuit at the next stage.

The objective lens 26 has the effective numerical aperture $NA_d$ for collecting the reflected beam Sr larger than the effective numerical aperture $NA_0$ for the incident beam, so that the objective lens 26 can efficiently collect the reflected beam Sr even if a scattering angle of the reflected beam Sr is within relatively large extent.

The OTF of the foregoing reproducing optical system will be considered.

Assuming that the objective lens 26 have circular apertures, and a reflective film has the amplitude reflectance which increases in proportion to an incident light intensity. It is also assumed, as expressed by the following equation (4), that the numerical aperture $NA_d$ of the objective lens 26 for passing the reflected beam is double the numerical aperture $NA_0$ of the objective lens 26 for passing the incident beam from semiconductor:

$$NA_d = 2NA_0 \qquad (4)$$

Figure 4:
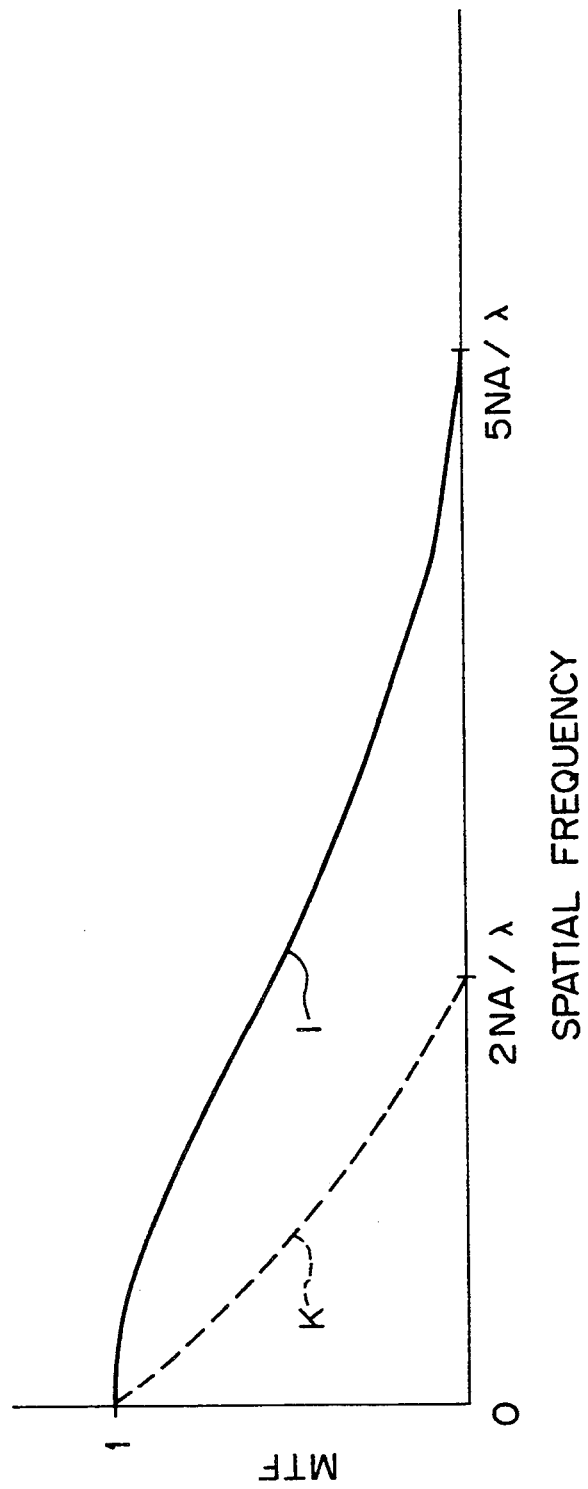
FIG. 4 is a diagram showing MTF of the optical system shown in FIG. 3.

Calculating the OTF under the above conditions, its absolute value MTF (Modulation Transfer Function) varies as indicated by a curve I in FIG. 4. It will therefore be understood that the cut-off spatial frequency of the optical system is extended toward the high frequency as compared with that of a conventional reproducing optical system (indicated by a curve K).

As described above, the numerical aperture $NA_d$ of the objective lens for passing the reflected beam therethrough is made larger than the numerical aperture $NA_0$ of the objective lens for passing the incident beam therethrough, so that the cut-off spatial frequency can be extended toward the high frequency. This means that the resolution of the disk can be improved and that information signals can be recorded on the optical disk 21 at a higher density.

Figure 5:
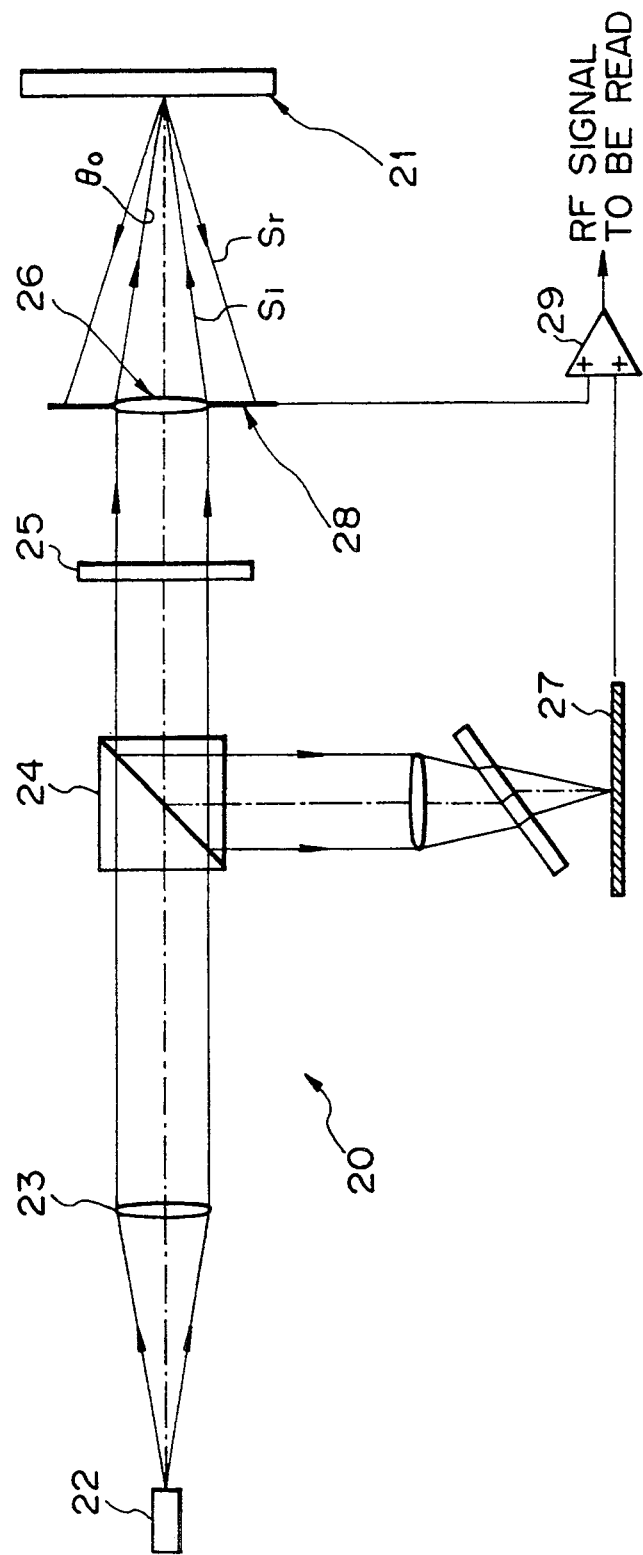
FIG. 5 is a diagram showing another embodiment according to the present invention.

FIG. 5 shows another embodiment of the present invention. In FIG. 5, a reproduction optical system 20 is constructed similarly to the first embodiment. In the system 20, a collimator lens 23, a polarization beam splitter 24, a quarter wave plate 25, and an objective lens 26 are disposed in turn on an optical path between a semiconductor laser 22 and an optical disk 21 from the laser to form an focusing optical system. while a four-divided light receiver 27 is disposed on another optical path extended from the polarization beam splitter 24, and an annular light receiver 28 is displaced around the objective lens 26 in a receiving optical system.

The four-divided light receiver 27 serves to receive a portion of the reflected beam Sr collected by the objective lens 26, while the annular light receiver 28 receives a portion of the reflected beam Sr which was not passing through the objective lens 26. Then, output signals from the light receivers 27 and 28 corresponding to the received beams are added together in an adder 29 to produce an RF signal to be read.

More specifically, a portion of the reflected beam Sr reflected by the optical disk 21 with scattering angles up to $\theta_0$ is received by the four-divided light receiver 27 through the objective lens 26. On the other hand, a portion of the reflected beam Sr having scattering angle larger than $\theta_0$ is received by the annular light receiver 28. It can therefore be understood that the effective numerical aperture $NA_d$ of the light receiving optical system is larger than the effective numerical aperture $NA_0$ of the objective lens of the focusing optical system. This means that the same advantages as those of the previous embodiment can be obtained.

In any embodiments according to the present invention, the cut-off spatial frequency of the reproducing optical system can be made higher as compared with that of a conventional reproducing optical system. It is therefore possible to improve the resolution of the optical disk 21, whereby information signals including high spatial frequencies which have not been reproduced before can be recorded on the optical disk 21, and they can be read out.

According to the present invention, the effective numerical aperture of a receiving optical system for receiving reflected beam from a recording medium including a reflective film, whose reflectance depends on an incident light intensity therein, is larger than that of an focusing optical system for impinging the reading beam on the recording medium, so that even reflected beams having large scattering angles can be efficiently led to the receiving optical system. As a result, the cut-off spatial frequency which corresponds to the resolution can be extended to the higher frequency. Highly dense recording can be performed on the recording medium.

It is understood that the foregoing embodiments and accompanying drawings are merely illustrative, but not limitative, and the present invention should be restricted only within the scope of the appended claims. Those skilled in the art may easily reach other applications and modifications without departing from the scope of the present invention, and it is intended that the present invention encompass all such applications and modifications as fall within the scope of the appended claims.

What is claimed is:

1. An optical information reading apparatus comprising:
    an focusing optical system for impinging a reading beam on a recording medium including a reflective film whose reflectance depends on an incident light intensity therein; and
    a receiving optical system for receiving the reading beam reflected by said recording medium, wherein the effective numerical aperture of said light receiving optical system is larger than the effective numerical aperture of said focusing optical system.

2. An optical information reading apparatus according to claim 1, wherein the amplitude reflectance of said reflective film substantially proportional to an incident light intensity therein.

3. An optical information reading apparatus according to claim 1, further comprising an objective lens, said objective lens having an incident aperture for passing said reading beam to the recording medium and a light-receiving aperture for passing said reflected beam therethrough, wherein said light-receiving aperture is larger than said incident aperture.

4. An optical information reading apparatus according to claim 1, wherein said focusing optical system includes:
    an objective lens; and
    light receiving means disposed around said objective lens for receiving a portion of said reflected beam which dose not pass through said objective lens.

* * * * *